US009225548B2

(12) United States Patent
Császár et al.

(10) Patent No.: US 9,225,548 B2
(45) Date of Patent: Dec. 29, 2015

(54) METHOD AND APPARATUSES FOR ALLOWING A NOMADIC TERMINAL TO ACCESS A HOME NETWORK ON LAYER 2 LEVEL

(75) Inventors: András Császár, Budapest (HU); János Harmatos, Budapest (HU); Attila Mihaly, Dunakeszi (HU); Oktavian Papp, Tinnye (HU); Lars Westberg, Enkoping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 533 days.

(21) Appl. No.: 12/676,663

(22) PCT Filed: Sep. 7, 2007

(86) PCT No.: PCT/EP2007/059430
§ 371 (c)(1),
(2), (4) Date: Apr. 13, 2010

(87) PCT Pub. No.: WO2009/030282
PCT Pub. Date: Mar. 12, 2009

(65) Prior Publication Data
US 2010/0309894 A1 Dec. 9, 2010

(51) Int. Cl.
H04W 4/00 (2009.01)
H04L 12/46 (2006.01)
(52) U.S. Cl.
CPC ........ H04L 12/4641 (2013.01); H04L 12/4633 (2013.01)
(58) Field of Classification Search
CPC ..................................... H04W 84/12
USPC ......................................... 370/338
See application file for complete search history.

(56) References Cited

U.S. PATENT DOCUMENTS 6,151,628 A * 11/2000 Xu et al. ................. 709/225
2004/0165600 A1 * 8/2004 Lee ......................... 370/395.53
(Continued)

FOREIGN PATENT DOCUMENTS

EP 0917318 A2 5/1999
EP 0986222 A2 3/2000
(Continued)

OTHER PUBLICATIONS

Chuah, M.C., et al. "Mobile Virtual Private Dial-Up Services", Bell Labs Technical Journal, Wiley, CA, US, vol. 4, No. 3, Jul. 1, 1999, pp. 51-72.
(Continued)

Primary Examiner — Samina Choudhry
(74) Attorney, Agent, or Firm — Rothwell, Figg, Ernst & Manbeck, P.C.

(57) ABSTRACT

A method of allowing a nomadic terminal to access a home network on the Layer 2 level. The method comprises connecting said terminal to a remote access network via an access point, the remote access network being connected to an operator's backbone network via a remote access router. Signalling is exchanged between the access point and an authentication server within the backbone network in order to authenticate the terminal to the authentication server and, following successful authentication, a Layer 2 tunnel extending across the backbone network is established for the purpose of connecting said nomadic terminal to the home network.

20 Claims, 16 Drawing Sheets

(56) References Cited

U.S. PATENT DOCUMENTS

| | | | |
|---|---|---|---|
| 2004/0214576 A1* | 10/2004 | Myers et al. | 455/445 |
| 2004/0221042 A1* | 11/2004 | Meier | 709/227 |
| 2005/0152305 A1* | 7/2005 | Ji et al. | 370/328 |
| 2007/0153799 A1* | 7/2007 | Sorrini et al. | 370/395.1 |
| 2008/0117884 A1* | 5/2008 | Ishii et al. | 370/338 |

FOREIGN PATENT DOCUMENTS

| | | |
|---|---|---|
| JP | 2005-117656 | 4/2005 |
| WO | 03005648 A2 | 1/2003 |

OTHER PUBLICATIONS

Office Action issued on Oct. 31, 2012, in corresponding European Application No. 07820081.3, 5 pages.

Office Action issued on Jan. 8, 2013, in corresponding Japanese Application No. 2010-523283, 3 pages.

Office Action issued on Mar. 21, 2013, in corresponding European Application No. 07 820081.3, 6 pages.

Enterasys: "Subnet Roaming with the RoamAbout Wireless Switch System", Internet Citation, May 2005, XP002459694, 8 pages.

Enterasys Networks et al: "RoamAbout Mobility System Software(TM) Version 5.0 Quick Start Guide", Nov. 1, 2006, XP055056211, 10 pages.

Communication dated Aug. 29, 2014, issued in European Patent Application No. 07820081.3-1505, 6 pages.

Enterasys Networks "RoamAbout Mobility System Software Configuration Guide Version 5.0" Jan. 2007, XP55136124, 592 pages.

* cited by examiner

METHOD AND APPARATUSES FOR ALLOWING A NOMADIC TERMINAL TO ACCESS A HOME NETWORK ON LAYER 2 LEVEL

CROSS-REFERENCE TO RELATED APPLICATIONS

This application is a 35 U.S.C. §371 National Phase Application from PCT/EP2007/059430, filed Sep. 7, 2007, and designating the United States.

TECHNICAL FIELD

The present invention relates to a method and apparatus for facilitating network interconnectivity. In particular, though not necessarily, the invention relates to the interconnection of LANs.

BACKGROUND

It is desirable to allow users of a "home" LAN to access that LAN even when they are away from the home LAN environment. In many cases, this means allowing the user to connect to a LAN in his current location, e.g. a WLAN hotspot or a public Ethernet access, and through that connection to the home LAN.

The inter-connection of private, e.g. house and office, networks across intervening broadband networks is possible using already standardised solutions (or solutions under standardisation). For example, work carried out by the Internet Engineering Task Force (IETF) deals with providing so-called "pseudo wires" between access points to an IP or Multiprotocol Label Switching (MPLS) network and which emulate Ethernet services over the IP or MPLS network. Work carried out by the IEEE deals with LAN interconnection solutions, where the intermediate operator-provided network is also itself an Ethernet network.

Ethernet is an example of a Layer 2 (L2) networking protocol. In order to enable the inter-connection of different Ethernet networks, L2 tunnels and L2VPN solutions are required. One such solution is that known as "EtherIP" [IETF RFC3378], which encapsulates Ethernet packet at a sending side LAN with an IP header, and sends the packets to an access router (AR) of the receiving side LAN which decapsulates the packets and bridges the Ethernet frame as if it was a L2 node (switch, bridge). Another currently standardised solution is to use L2TPv3 [RFC4719, "Transport of Ethernet Frames over Layer 2 Tunnelling Protocol Version 3 (L2TPv3)"] to transport Ethernet frames in an IP/UDP packet. An extension of L2TP for L2VPN usage also exists and which enables L2 tunnels to be connected to virtual bridges, so that standard Ethernet MAC forwarding can be used along with MAC learning to forward the Ethernet frames received by the virtual switch [RFC4667, "Layer 2 virtual private network (L2VPN) extensions for layer 2 tunneling protocol (L2TP)"].

Different solutions exist for LAN inter-connect over MPLS provider networks. One solution is a pseudo-wire over MPLS as described in RFC4448, "Encapsulation Methods for Transport of Ethernet over MPLS Networks". Also, The L2VPN working group of the IETF is standardising a Virtual Private LAN Service (VPLS) to transport L2 protocol data units over IP/MPLS networks [IETF WG Layer 2 Virtual Private Networks (l2vpn), http://ietforg/html.charters/l2vpn-charter.html]. VPLS is also referred to as Transparent LAN Service and Virtual Private Switched Network service. It incorporates MAC address learning, flooding, and forwarding functions in the context of pseudo-wires that connect individual LANs across a packet switched network. Implementations of VPLS in an IP/MPLS router often refer to the virtual bridge functionality as VSI (Virtual Switch Instance).

There exist solutions to inter-connect two (or more) LANs using an intervening L2 operator (provider) networks. If the provider's network is Ethernet, then the 802.1ad Q-in-Q method or the 802.1ah Mac-in-Mac method could be used. In the case of 802.1ad, the original 802.1Q header has been extended with an additional virtual LAN (VLAN) tag called "S-VLAN" (Service VLAN), which makes it possible to build up a virtual network structure. Whilst the original VLAN tag defined in the 802.1Q standard is transmitted transparently by 802.1ad capable switches, a virtual topology can be defined between 802.1ad capable switches by configuring VLANs appropriately on the switch interfaces, and switching and forwarding based on the S-VLAN tag. The switches on the border of an 802.1ad and 802.1Q segment are responsible for generating and stripping the S-VLAN tag.

One possible application of 802.1ad is to use the S-VLAN tag for identification of a service. It is important to note that, in the case of 802.1ad, the customer and provider network are not separate, so both networks appear as a large domain, causing for example an STP action in a customer network to impact on the provider network.

802.1ah MAC-in-MAC provides for the encapsulation of an entire Ethernet frame and a new MAC header is generated by the edge switch on the border of an 802.1ah domain. Within the domain the original Ethernet frame is transmitted transparently, with all switching and forwarding decisions in the intermediate switches being based upon the destination MAC address and VLAN tag(s) in the outer MAC header. The main benefit of 802.1ah is its scalability to large Ethernet networks, and in addition the clear separation that it provides between the provider and customer Ethernet networks.

Existing L2VPN solutions rely on static configuration and assume fixed locations for customer sites. Mobile users are therefore restricted to using only pre-configured customer sites. On the other hand, while L3 mobility solutions such as MobileIP (MIP) potentially offer unrestricted access, they do not offer L2 transparency. This means that if a terminal uses L2 specific protocols (e.g. protocols relying on broadcast L2 frames), the L3 solution will not work. Moreover, L3 mobility solutions do not allow overlapping addresses for mobile hosts. Although a terminal may reside in a remote subnet with its home IP address, this home IP address must be unique. Thus for example two mobile terminals cannot have the same home IP address in the same access network. Unfortunately, home users often use private address spaces which may very easily be overlapping.

Some L3 mobility solutions require the implementation of dedicated protocols in terminals, and which are often not available (e.g., MIP is not available in Windows™). L3 solutions are to some extent dependent on the version of IP. However, if mobility is transparent at layer 2, then the terminal may use either IPv4 or IPv6 in its home LAN.

SUMMARY

According to a first aspect of the present invention there is provided a method of allowing a nomadic terminal to access a home network on the Layer 2 level, the method comprising:

connecting said terminal to a remote access network via an access point, the remote access network being connected to an operator's backbone network via a remote access router;

exchanging signalling between the access point and an authentication server within the backbone network in order to authenticate the terminal to the authentication server; and following successful authentication, establishing a Layer 2 tunnel extending across the backbone network for the purpose of connecting said nomadic terminal to the home network.

The invention thus provides for triggering of the Layer 2 tunnel establishment upon successful authentication of the nomadic terminal to the backbone network. As far as the terminal is concerned, the process of establishing the tunnel is transparent, and no modifications to the terminal are necessary. A key aspect to the implementation of the invention is the introduction of functionality into the backbone network which detects authentication and triggers tunnel establishment by configuring access routers and/or access points as appropriate.

The invention is applicable in particular to networks which implement the Layer 2 using Ethernet, in which case said step of establishing an Ethernet Layer 2 tunnel may use one of: EtherIP, Ethernet over Point-to-Point Protocol (PPP), L2TPv3, and VPLS.

The invention encompasses embodiments where the access router is an endpoint of the Layer 2 tunnel, as well as embodiments where the access point is the tunnel endpoint.

The key functionality of the invention may be implemented as a new node within the backbone network referred to here as a Mobility Manager function. The method comprises informing the Mobility Manager function within the operator's backbone network of a successful authentication, the Mobility Manager function configuring one or both of said remote access router and said remote access point to establish said Layer 2 tunnel. The Mobility Manager function may further configure said home access router to establish said Layer 2 tunnel. In some cases, the Mobility Manager function may cooperate with a peer Mobility Manager function associated with the home network in order to establish said Layer 2 tunnel. This arrangement allows nomadic terminals to access their home networks even when their network operator has an agreement with an own backbone network operator which is different from the backbone network to which the remote access network is attached, providing that an agreement exists between the two backbone network operators.

According to a second aspect of the present invention there is provided apparatus for providing mobility management within a communication system, the apparatus being arranged in use to:

receive authentication related signalling in respect of a nomadic terminal connected to an access point of a remote access network and as a result to establish a Layer 2 tunnel extending across a backbone network for the purpose of connecting said nomadic terminal to the home network.

In future networks this apparatus may be implemented as a Mobility Manager function. The apparatus may be standalone, or may be collocated with an authentication server.

According to a third aspect of the present invention there is provided apparatus for providing an access point for a nomadic terminal to a remote access network, the apparatus having an interface for connection to a mobility manager within an operator's backbone network, the apparatus being configurable via said interface to establish a Layer 2 tunnel between itself and home network of the nomadic terminal.

According to a fourth aspect of the present invention there is provided apparatus for providing an access router to interconnect an access network to an operator's backbone network, the apparatus being configured to provide Layer 2 switching and having an interface towards a mobility manager within the operator's backbone network, the apparatus being further configurable via said interface to establish a Layer 2 tunnel towards a nomadic terminal or towards a home network of a nomadic terminal.

DETAILED DESCRIPTION

Figure 1:
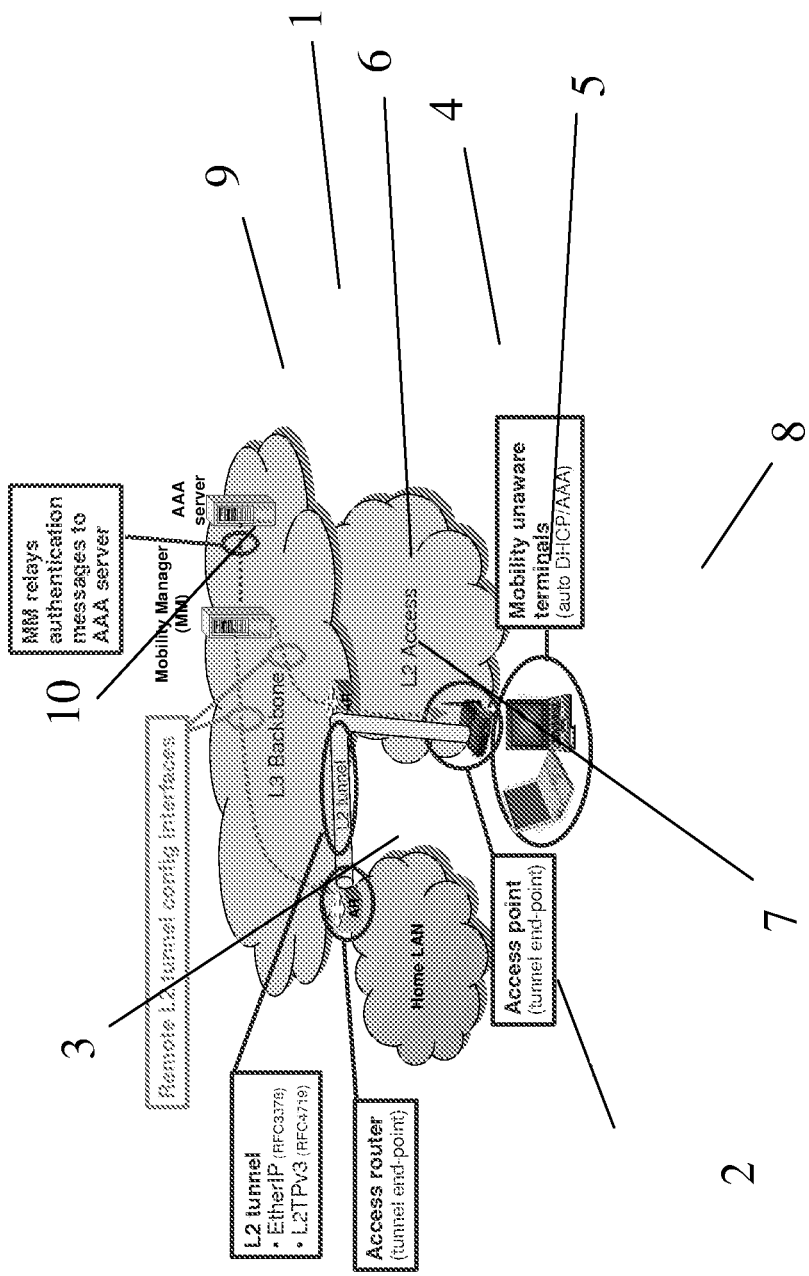
FIG. 1 illustrates schematically two L2 access networks interconnected via a L3 operator network using a L2 tunnel extending from home access router to remote access point.

FIG. 1 illustrates schematically an operator network 1 comprising a Layer 3 (L3) backbone, e.g. IP or MPLS. A corporate LAN 2, the "home" LAN, is connected to the operator network via an Access Router (AR) 3. The home LAN is assumed to be an Ethernet network. FIG. 1 illustrates further a remote access network 4, which is an Ethernet network connecting WLAN hotspots or public Ethernet "jacks". It is assumed here that the operator network and the remote access network are owned by the same operator, or at least have established a trust relationship. A user connects to the remote access network 4 via an access point 5. The remote access network is connected to the operator network via an AR 6. In order to allow the user to seamlessly attach to the home LAN via the remote access network, a Layer 2 (L2) tunnel 7 is established between the home AR 3 and the remote access point AP 5 as described below.

When a mobile terminal or "host" 8 presents itself to the remote access point 5, it must authenticate itself to obtain L2 access. This is usually done via the IEEE 802.1x procedure. The specific application of 802.1x for WLANs is described in the 802.1i standard. The access point 5 uses an authentication or AAA server 9 within the operator network 1 to authenticate the terminal 8, using for example the RADIUS or DIAMETER protocol. The AAA server is standard functionality, and the address of the AAA server 9 is preconfigured in the remote access point. A new Mobility Manager (MM) 10 implements functions to use the AAA trigger for remote setup of connectivity to the home network. The MM may reside in the same physical node as the AAA server or at any other location suitable for receiving authentication messages sent to the AAA server. One possible implementation of the MM is as a proxy to the AAA server. In this case, AAA messages are forwarded from the access point 5 to the MM 10, which forwards them to the real AAA server 9.

If the MM 10 determines that the terminal 8 is allowed to access the remote access network 4, it will determine the home network and the corresponding access router, for example by mapping a MAC address of the terminal or a username/password combination to a home network address. It must also identify the serving access point, for example by examining the source address of the authentication message (e.g. from the header's source field). The MM will then remotely configure the home network AR 3 and the remote access point 5 to establish a L2 tunnel between them. L2 tunnels may be built using, for example, EtherIP, Ethernet over Point-to-Point Protocol (PPP), L2TPv3 or any similar present or future protocol supporting L2 tunneling. The remote AR 6 in this case functions in a standard manner, forwarding packets based upon L3, i.e. IP addresses. In this way, frames from the terminal are transported undisturbed to the home access router, which in turn will forward (bridge) the frame into the home network.

Figure 2:
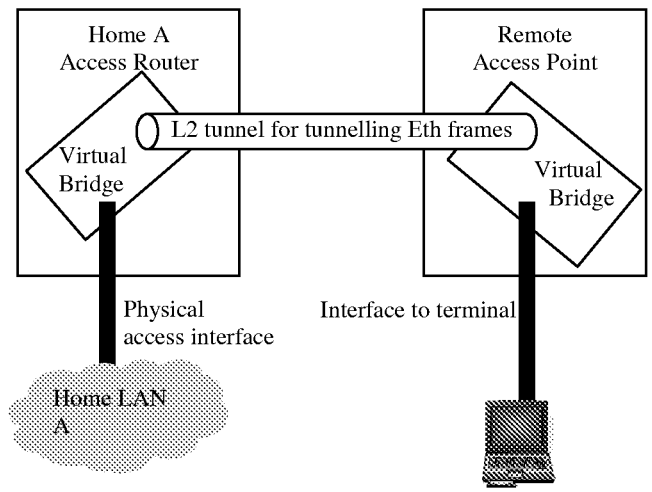
FIG. 2 illustrates the creation of a virtual bridge within the access point of FIG. 1.
Figure 3:
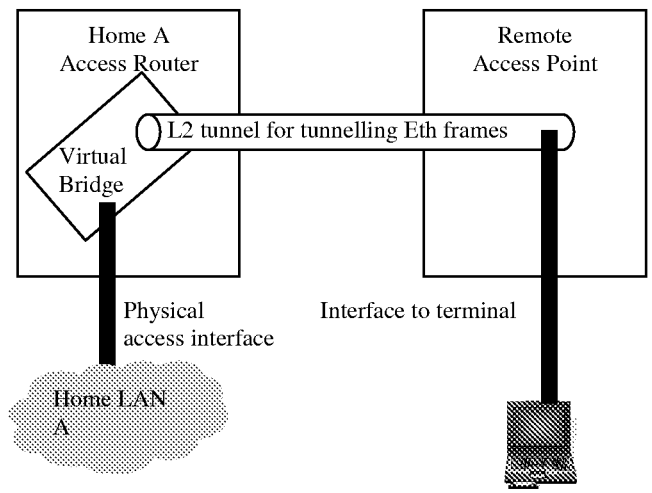
FIG. 3 illustrates the creation of a pseudo-wire within the access point of FIG. 1.

The next task is to configure the home AR 3 to bridge the interface leading to the home network with the newly established virtual interface, so that Ethernet frames are bridged between the two interfaces. This way, the home AR 3 is able to bridge between multiple remote hosts. The MM 10 then sets up the remote serving access point 5 to create a similar virtual bridge as illustrated in FIG. 2. Alternatively, it may directly bind the L2 tunnel as a pseudo-wire to the interface leading to the terminal as illustrated in FIG. 3. If the remote access point is a wired Ethernet switch, the terminal's interface can be learnt from, for example, the CallingStationID in the AAA request. On the other hand, the wireless interface of a WiFi access point is a medium shared among multiple terminals. Nonetheless, by applying 802.1i, the access point is capable of differentiating hosts (allow, not allow), and may even setup an encrypted connection to the host, so it would be relatively straightforward to achieve a logical interface for a specific terminal. Specifically, this could be implemented via firmware or a software update in the wireless access points.

Figure 4:
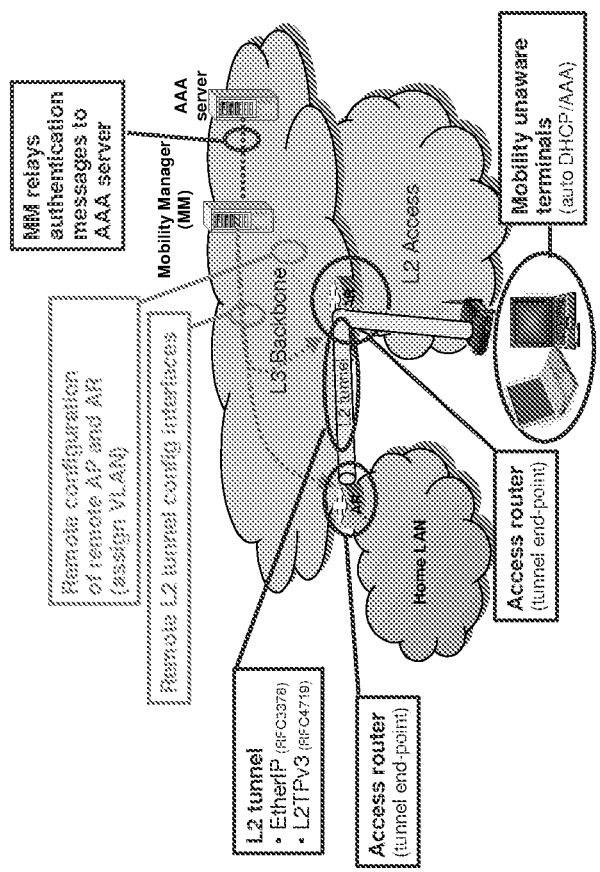
FIG. 4 illustrates schematically two L2 access networks interconnected via a L3 operator network using a L2 tunnel extending from home access router to remote access router.

The embodiment illustrated in FIG. 1 assumes that the remote access point 5 contains the required L2 tunneling functionality, e.g. EtherIP or a suitable alternative. If this is not the case, according to an alternative embodiment, the remote AR 6 may terminate the L2 tunnel. This is illustrated in FIG. 4. In this case, the MM 10 must remotely configure the home and the remote ARs 3,6 to establish the L2 tunnel, and the MM will assign a specific VLAN tag to the terminal 8 in the access point 5. This way, frames from the terminal 8 are transported undisturbed to the remote network AR 6, which will in turn forward (bridge) the frames through the L2 tunnel.

Regardless of whether the approach of FIG. 1 or of FIG. 4 is employed, it is the authentication procedure which is used to trigger the remote configuration which in turn establishes the transparent access to the home LAN. If this triggering and the remote configuration are reasonably fast, then session continuity can be provided when changing the access (e.g. during handovers).

Figure 5:
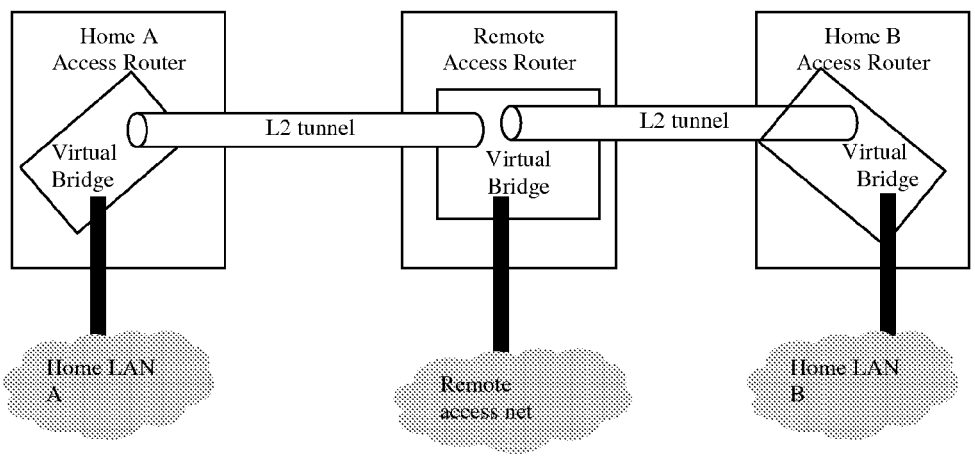
FIG. 5 illustrates the establishment of multiple bridged L2 tunnels extending from a remote access network to respective home networks.

Considering now an alternative lightweight but possibly less secure mechanism, after processing the authentication, the MM could configure the remote access network access router and the home access router to establish a L2 tunnel between each other, without tunneling below the routers. The L2 tunnel may again be built using EtherIP, L2TPv3, VPLS etc. The next task would be to configure the access router to bridge the interface leading to the access network with the newly established virtual interface, so that Ethernet frames are bridged between the two interfaces. This is illustrated in FIG. 5.

This solution establishes connectivity to the home network, although it has an unfortunate side-effect. If the remote access network handles multiple terminals from multiple home networks (A and B), then these different home networks will be connected on L2 due to multiple bridged L2 tunnels, as shown in FIG. 5. Therefore, broadcast messages will be received by different home networks raising scalability and privacy issues.

Figure 6:
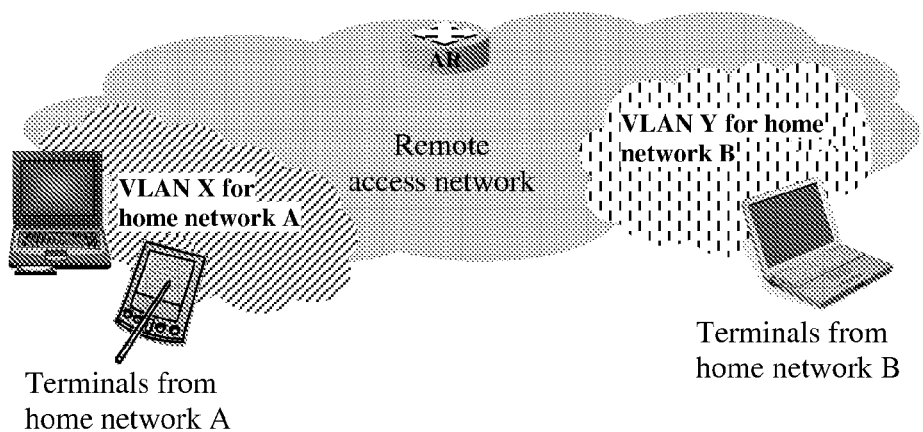
FIG. 6 illustrates the mapping of VLAN tags to home networks used by a remote access network.

To ensure the separation of traffic belonging to different home networks, an advantageous embodiment should map terminals in the remote network to home network VLAN tags as illustrated in FIG. 6. This should be done in such a way that terminals from the same home network are mapped to the same VLAN tag to enable local communication and to decrease the number of required VLAN identifiers. To do this, the MM should configure the access point of the terminal to assign the selected VLAN tag to every frame it receives from the terminal. If the access point is an Ethernet switch, this can be done on a per-interface basis as described in the proposed 802.1ad standard—the so called Q-in-Q encapsulation method. Proper VLAN tagging in the access point requires the assignment of the appropriate VLAN tag to that port where the terminal is connected. The port can be identified on the basis of the terminal MAC address, which can be obtained from the frame sent to the AAA server (e.g., CallingStationID in the AAA request). In the case of a wireless interface however, application of 802.1i allows the access point to differentiate hosts as already described.

Figure 7:
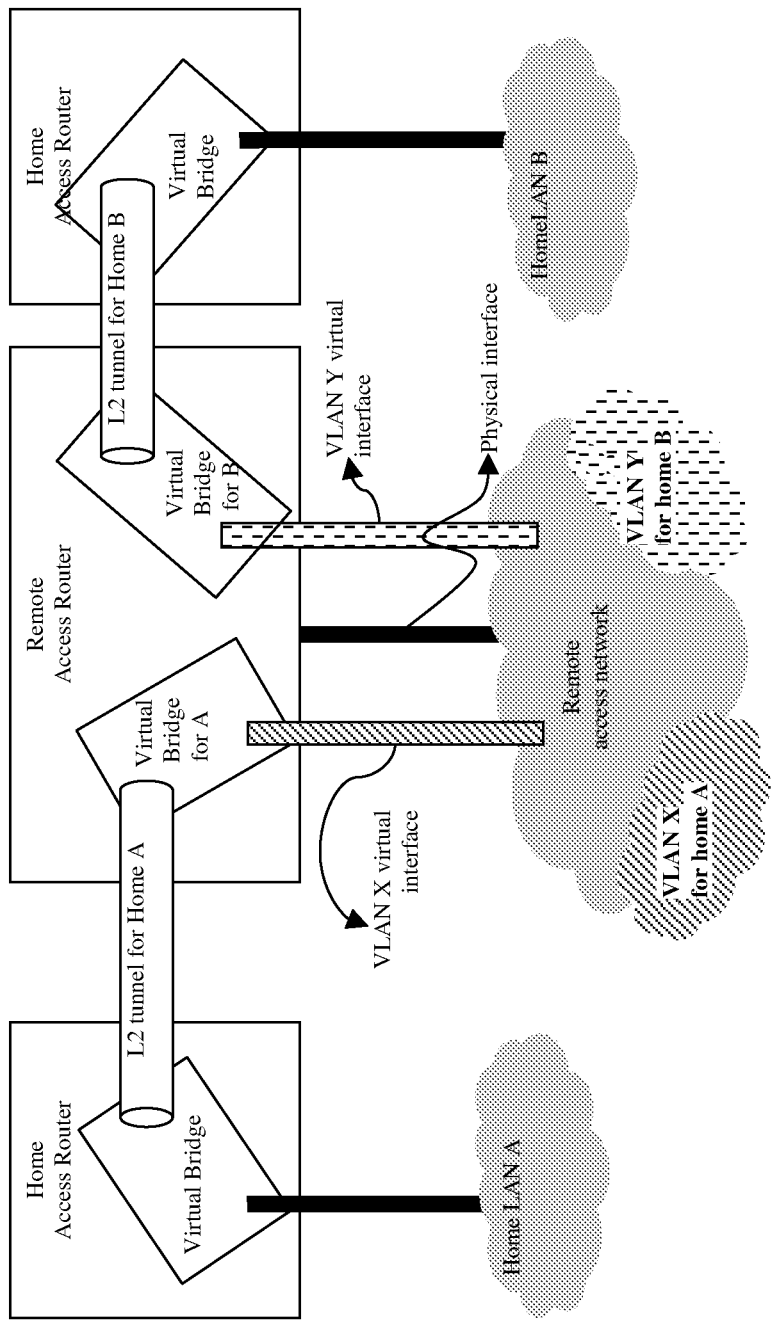
FIG. 7 illustrates the bridging of VLAN virtual interfaces with the corresponding L2 tunnels leading to the home networks associated with VLAN tags.
Figure 8:
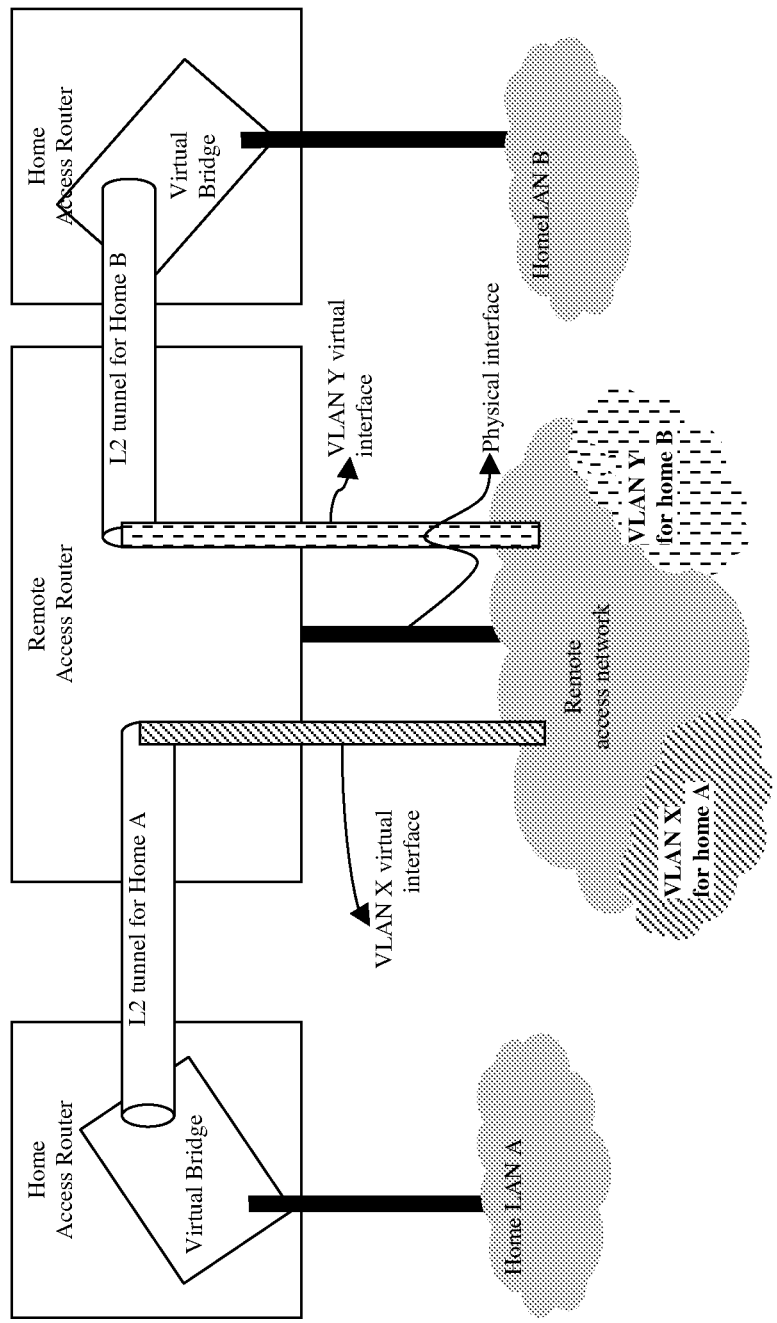
FIG. 8 illustrates the connection of VLAN virtual interfaces with the corresponding L2 tunnels leading to the home networks associated with VLAN tags via pseudo-wires.

The MM should also configure VLAN encapsulation/decapsulation in the access router. VLANs appear in the access router as virtual interfaces, which should be connected to the home access router's virtual bridge. Depending on the L2 tunnel type, it may be possible to implement this in two ways. Firstly, the VLAN virtual interfaces can be bridged with the corresponding L2 tunnels leading to the home network which the VLAN tag (or VLAN virtual interface) is assigned to. This is illustrated in FIG. 7. Secondly, the virtual interface may be connected via a pseudo-wire directly with the home network's virtual bridge. This is illustrated in FIG. 8.

The interior switches of the remote access network can be configured in such a way that they can transport the frames of different VLANs, so these interior switches need not be configured each time a new VLAN is assigned to a newly arriving terminal. Only the edges, i.e. the access nodes and the access router, need on-the-fly configuration to bind them to VLAN tags.

Figure 9:
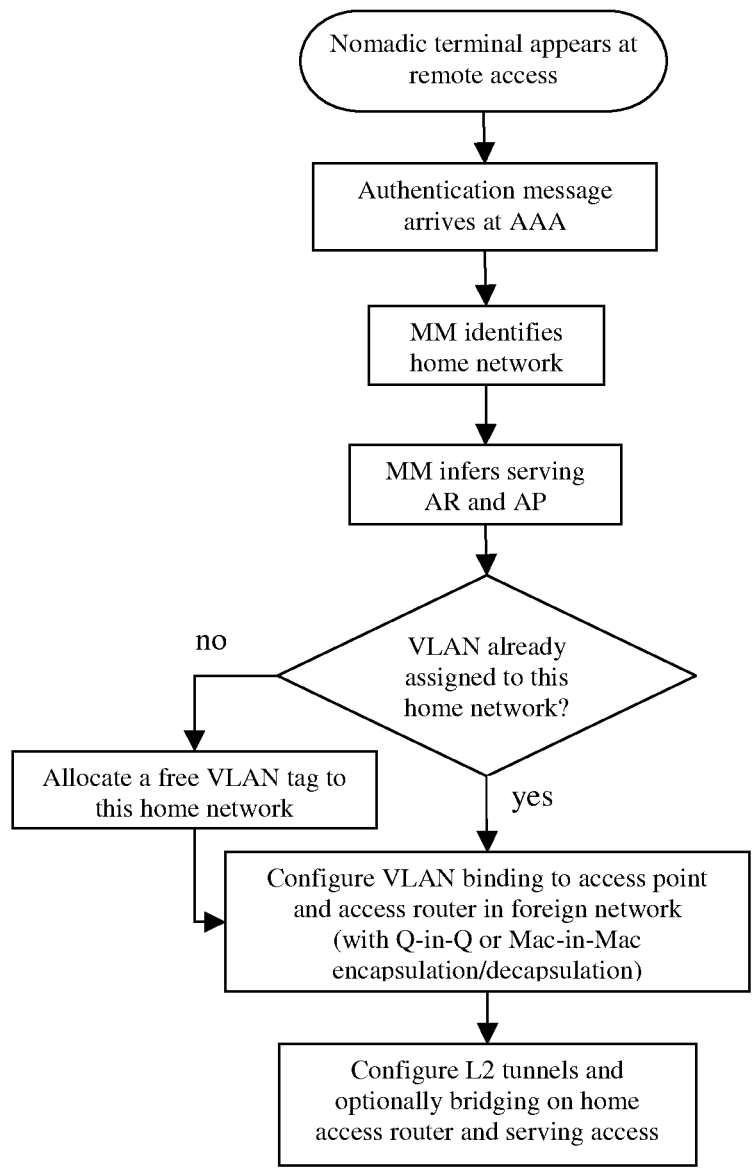
FIG. 9 is a flow diagram illustrating a procedure for establishing a L2 tunnel between a remote access network and a home network.
Figure 10:
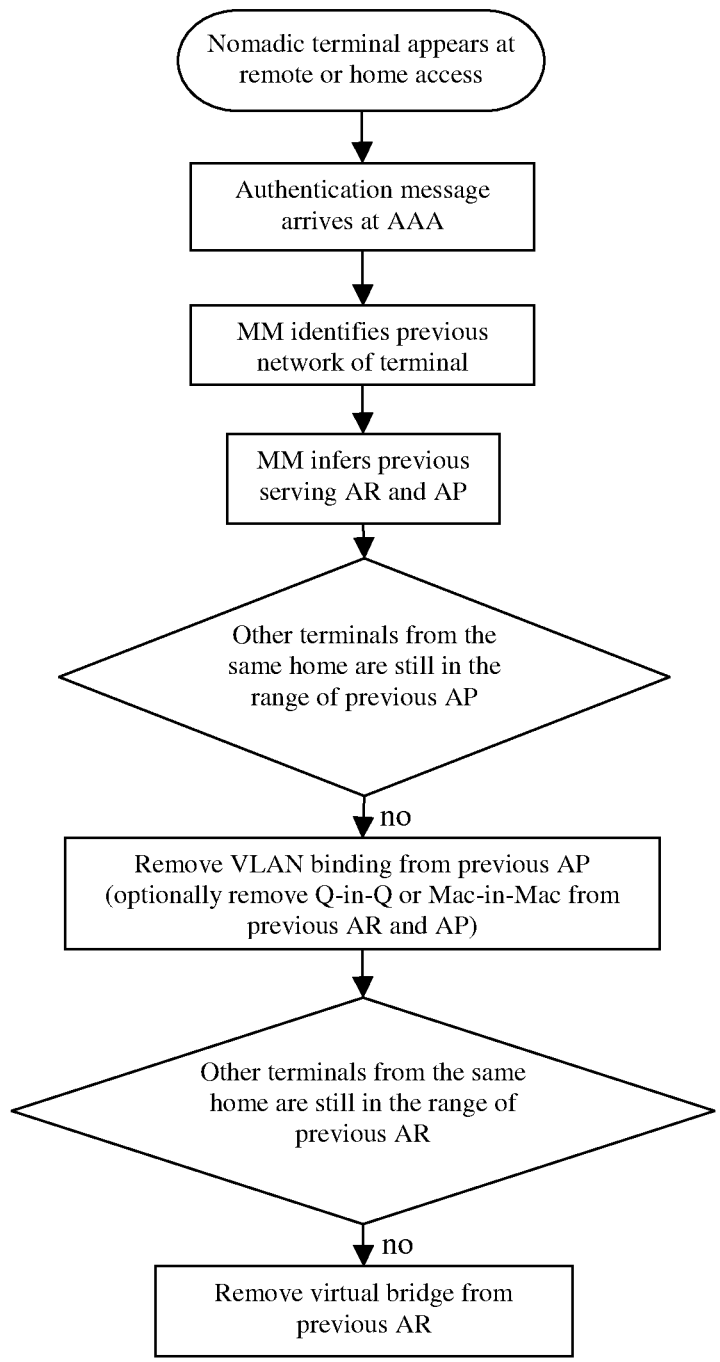
FIG. 10 is a flow diagram illustrating a procedure for tearing down a L2 tunnel established between a remote access network and a home network.

FIG. 9 is a flow diagram illustrating the process carried out by the MM, i.e. on-the-fly connection of a nomadic or mobile terminal to its home network. In order to reduce complexity and reduce scalability issues, the reverse process of tearing down connectivity for superfluous remote networks (i.e., remote accesses where there are no longer terminals belonging to a certain home network) is also required. This is illustrated in the flow diagram of FIG. 10.

The solutions presented above may result in scalability issues, as broadcast frames, or frames for which the direction of the destination is not yet learnt via MAC learning, are broadcast in the remote L2 network. Although the edge access nodes will filter packets based on VLAN tags, the MAC forwarding tables of the interior switches may become overloaded. To address this issue, the currently standardized 802.1ah Mac-in-Mac Encapsulation can be used. Instead of configuring Q-in-Q encapsulation in the access node, the MM should configure Mac-in-Mac encapsulation from the access node up to the access router.

Figure 11:
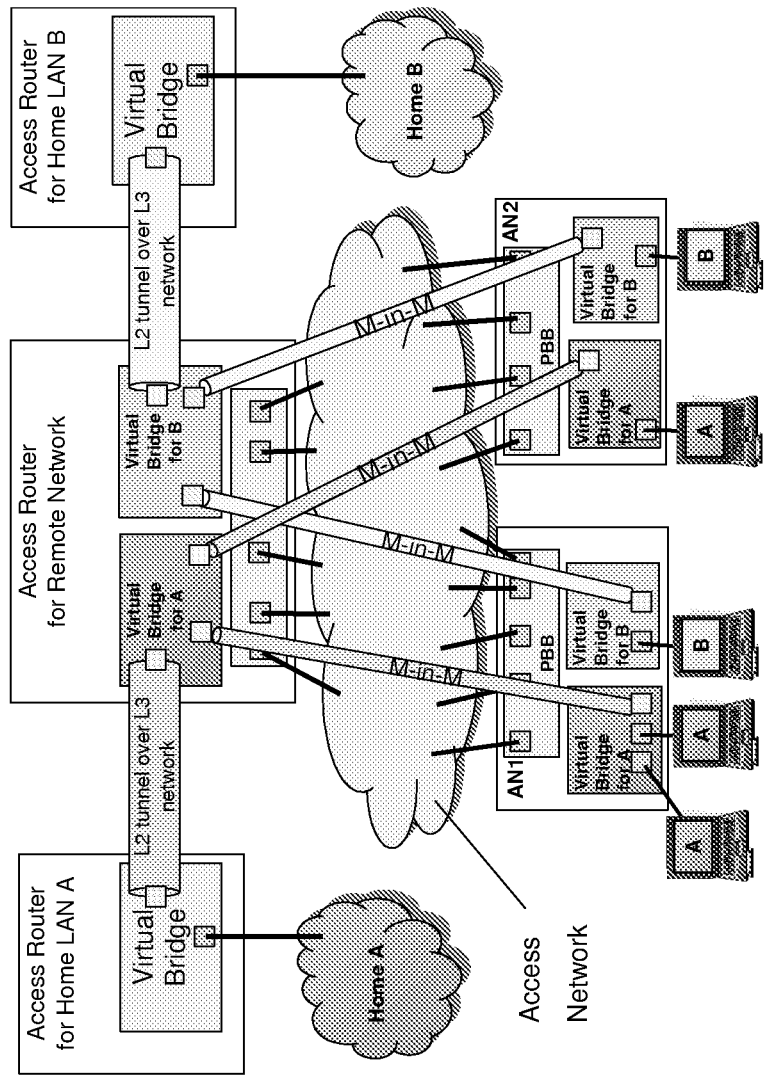
FIG. 11 illustrates a bridging and Mac-in-Mac tunneling structure.

The bridging and Mac-in-Mac tunneling structure is depicted in FIG. 11. This structure allows the encapsulated frames to be transported by Provider Backbone Bridges (PBBs) without their having to know the addresses of other access networks. The access node (AN1 or AN2 in FIG. 11) has to encapsulate the L2 frame coming from a host within an external L2 MAC header. This external header contains the access router's local MAC address as the destination. As a result, the provider's Ethernet switches inside the access network need to know the Ethernet routes only for themselves, the access nodes and the access router, and they do not need to maintain forwarding information for each possible home network. Before the virtual bridge in the access router bridges the received frames, it must strip the outer MAC header from the frame.

According to this structure, it is also possible to avoid virtual bridging in the remote access router. In this case, the Mac-in-Mac tunnels should be connected via a pseudo-wire to the home network. Note, however, that if there are multiple hosts in the remote access network at different access nodes, then each Mac-in-Mac tunnel will be connected to the home access router's bridge, leading to suboptimal network usage if the remote terminals communicate with each other.

It is possible or even likely that the home network will be administered by an operator other than the operator of the remote access network (and the provider network). In this case, the MM located within the provider network may not be able to reconfigure the access router of the home network, and in some cases it may not even be able to authenticate the newly appeared terminal. Of course, any MM associated with the home network has no right to reconfigure the remote access router.

To address this issue, a fixed access operator may pre-establish L2 tunnels with partner operator networks (based on appropriate contracts) in order to provide a connectivity service even from these other operator access networks. In this case, the two (home and serving) operators have pre-established points of interconnect (PoI) between which the L2 tunnels are established. IPSec may be used for security reasons.

Figure 12:
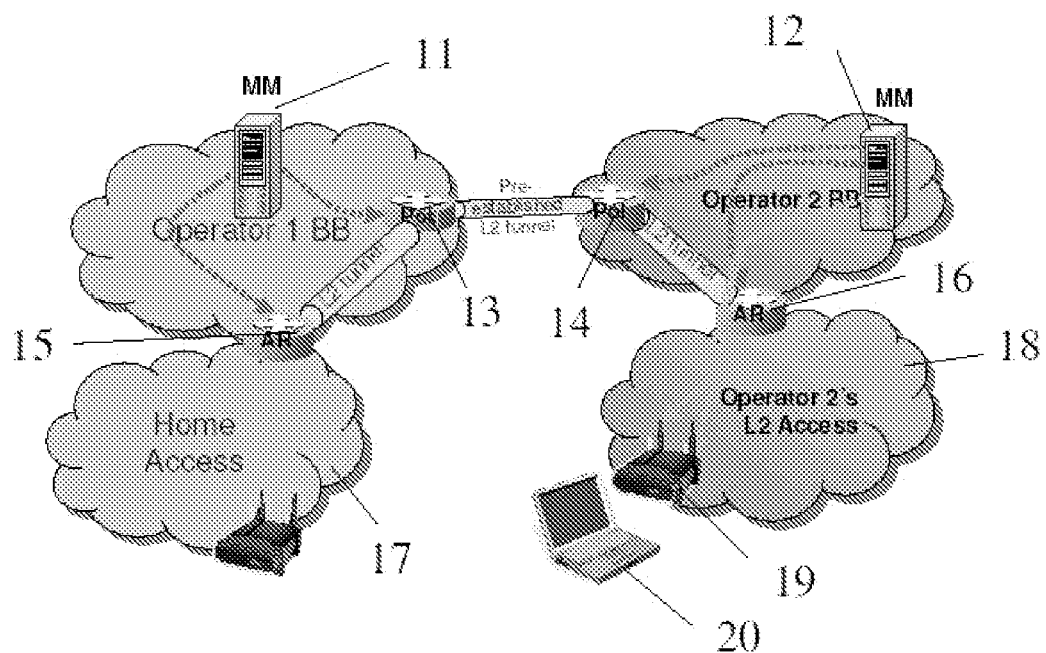
FIG. 12 illustrates schematically a system architecture which provides a pre-established L2 tunnel between PoIs in respective operator networks.

The task of the serving MM associated with the remote access network is to obtain the authentication messages from the terminal, to identify its home network, and to relay the authentication messages through the appropriate L2 tunnel to the home MM. To this end, the "serving" MM is provided with a database that maps the authentication data to the PoI address and home MM address. The MM in the home network reacts to receipt of a tunneled authentication request by configuring the L2 tunneling between the home AR and the PoI within the home operator network. The authentication reply messages from the home MM are sent through (or caught by) the serving MM. When the serving MM infers from the authentication messages that authentication is successful, it configures the L2 tunnel between the PoI and the serving AR in its network or between the PoI and the serving access point. The former configuration is illustrated in FIG. 12, where the home MM is identified by reference numeral 11, the serving MM by reference numeral 12, the respecting PoIs by 13 and 14, and the respecting ARs by 15 and 16. The home network is indicated by reference numeral 17, the remote access network by 18, the remote access network access point by 19, and the nomadic terminal by 20.

Figure 13:
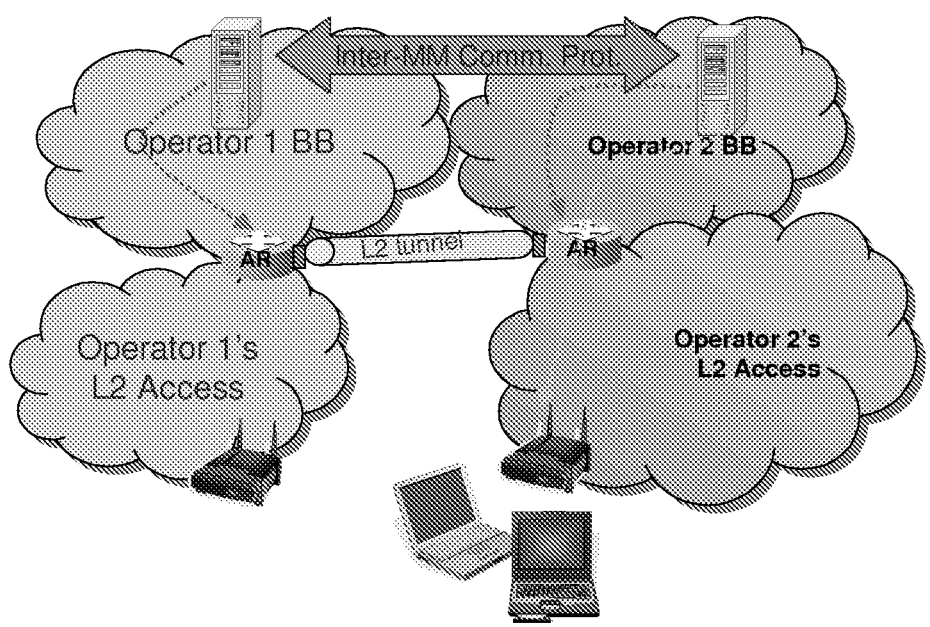
FIG. 13 illustrates schematically a system architecture which provides for the establishment of a L2 tunnel between PoIs in respective operator networks, following a negotiation between the provider networks.

If there is no pre-established tunnel between operators, the two MMs must inter-work. The MM of the new network may communicate and authenticate the terminal with its home MM, and each MM can configure the access router (or access point) in its own administrative area. This is illustrated in FIG. 13, where the tunnel is deployed between the access routers. [In an alternative approach, the tunnel is established between the home AR and the serving AP.] Such inter-working requires the use of a standardized and secure protocol between the two MMs. The MM of the new network must provide the authentication data of the terminal and the new access router's IP address. If the home MM properly authenticates the terminal, it has to acknowledge authentication and must provide the IP address of the corresponding home access router.

Figure 14:
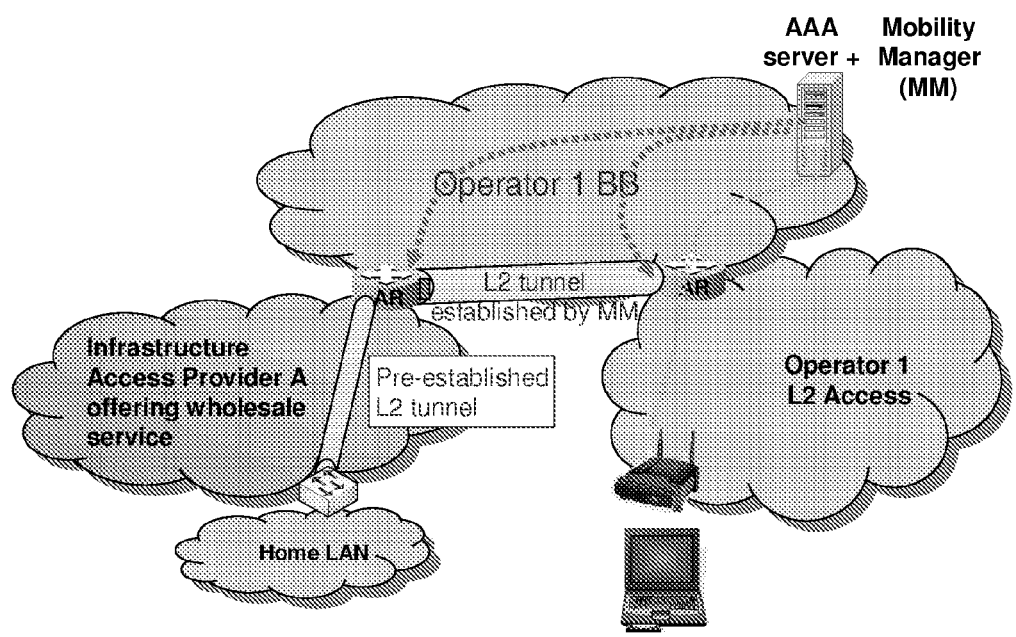
FIG. 14 illustrates a system architecture adapted to the case where a home LAN accesses the operator network through a wholesale service.

The mechanisms described here are applicable to the case where the home LAN accesses the operator network through a wholesale service. The home LAN connects to the service through an infrastructure provider. The infrastructure provider sets up a L2 tunnel to the operator network. This is shown in FIG. 14. In this case, the AR sees a virtual interface connecting it to the home LAN. However, the procedures performed in the MM are unchanged: it must setup a bridging between this (virtual) interface and the newly established L2 tunnel interface (also virtual) between the two ARs.

Figure 15:
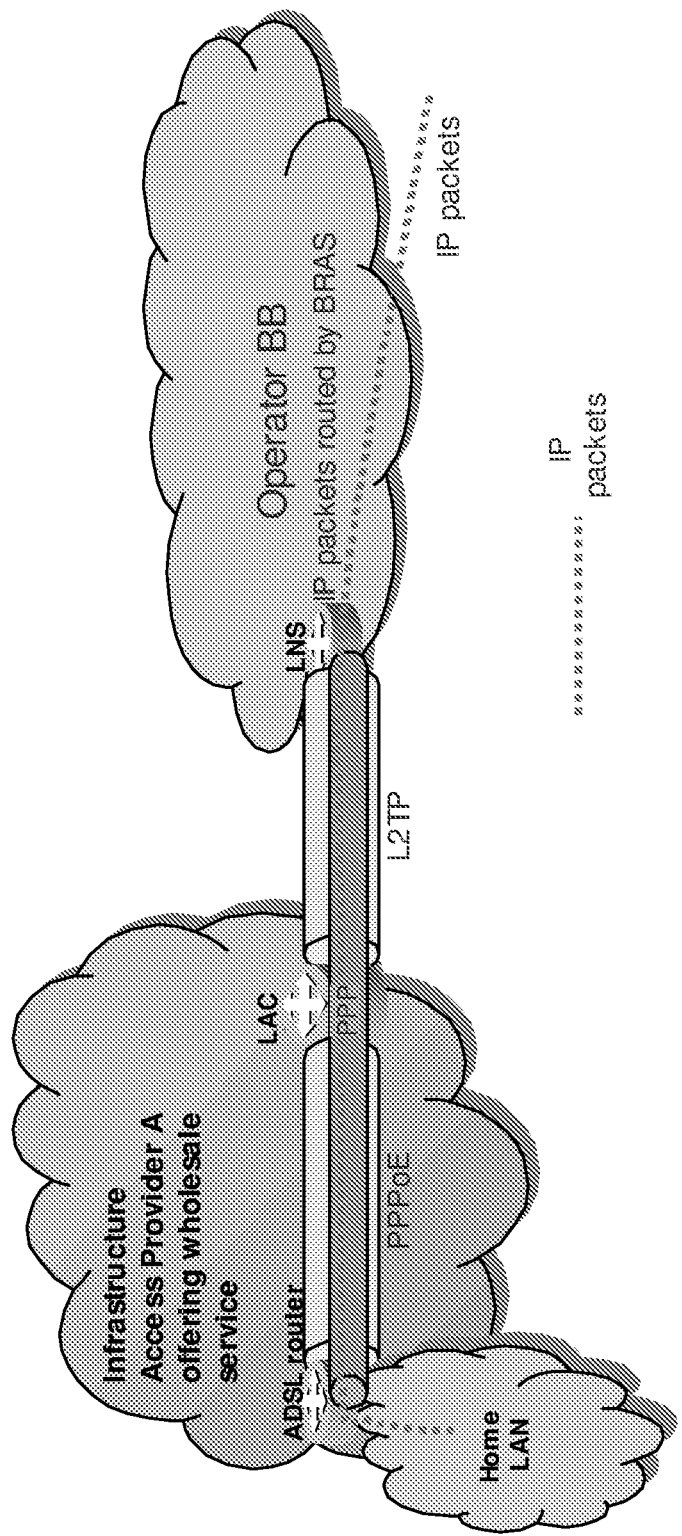
FIG. 15 illustrates a system architecture where a home LAN is behind an xDSL home router.

In the traditional xDSL service, the home LAN is behind an xDSL home router, which has a single IP address from the operator but which provides internal addressing via DHCP, firewall and NAT to the internal LAN. In this case, being the first IP hop, the xDSL router must be modified with the L2 tunneling capabilities to support transparent access of the home LAN from remote locations. Enhanced xDSL routers may be provided for this purpose. In the case of traditional xDSL with PPP, the xDSL router sends the "de-NATted" IP packets over PPP to the Broadband Remote Access Server (BRAS), which removes the PPP header and forwards the IP packet. [PPP itself may be transport over a combination of PPPoE or L2TP protocols.] This is illustrated in FIG. 15, where LAC indicates a L2TP Access Concentrator.

Figure 16:
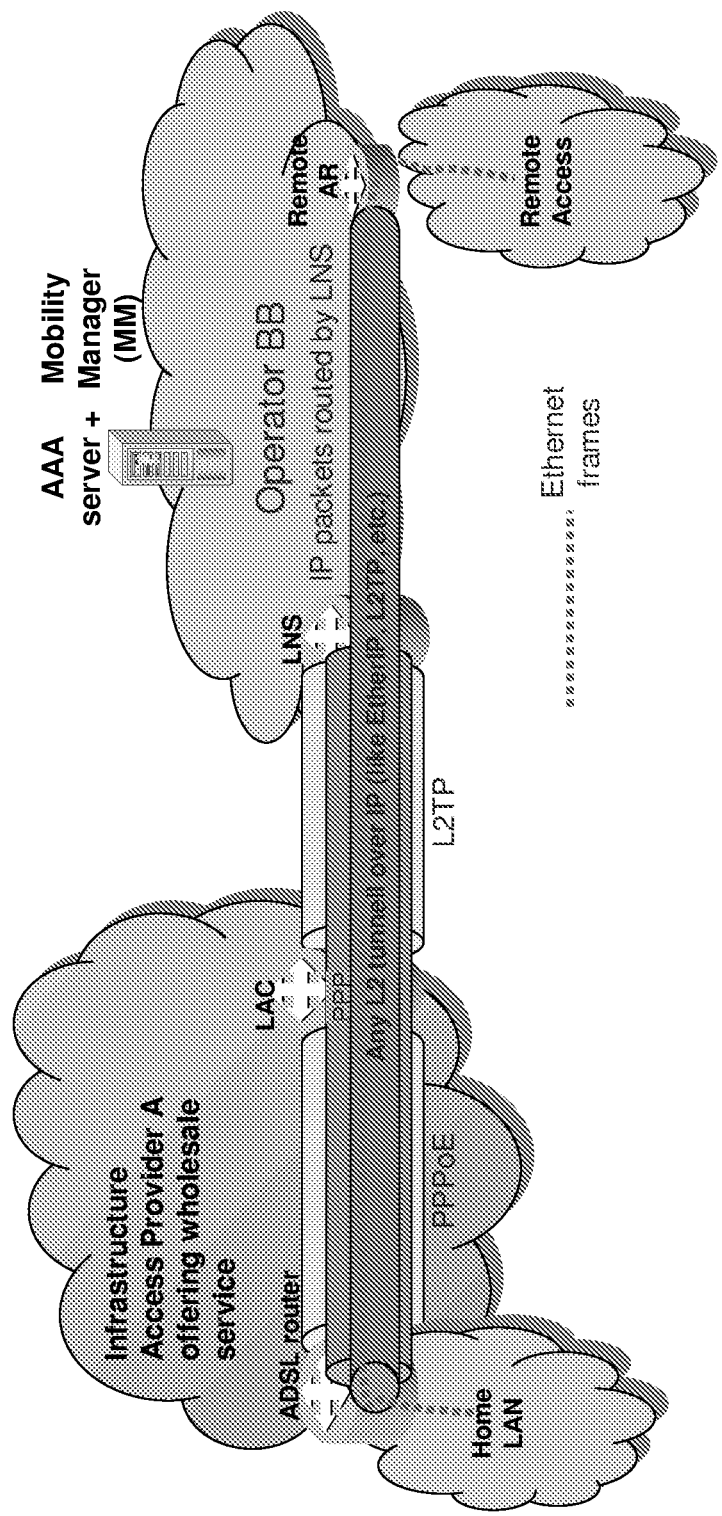
FIG. 16 illustrates schematically the configuring of an xDSL router as a home access router to directly tunnel Ethernet frames to a remote access router.

Considering further xDSL with PPP, one implementation involves configuring the xDSL router as a home AR to directly tunnel Ethernet frames to the remote location's access router. This is illustrated in FIG. 16 (assuming implementation of xDSL as ADSL). In this case, the xDSL home router must also implement the virtual bridge functions so that it is capable of bridging Ethernet frames into the L2 tunnel. The MM in this case has to configure the home ADSL router (as a home access router) and the remote AR/AP remotely.

Figure 17:
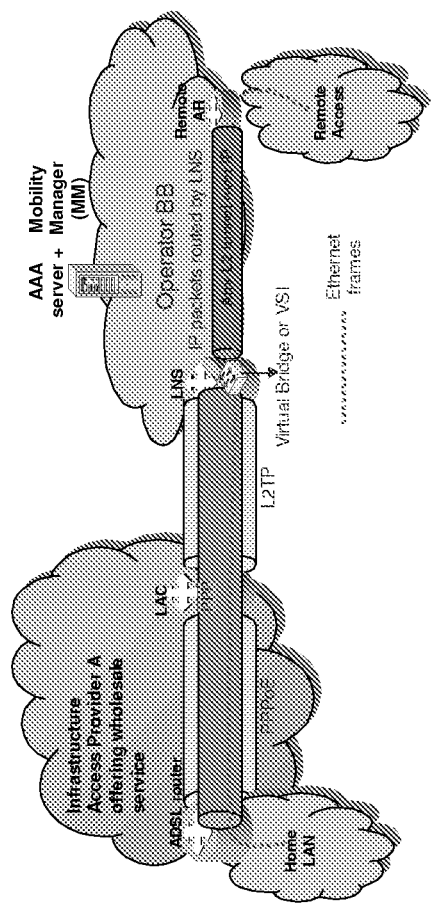
FIG. 17 illustrates schematically a system architecture in which a home DSL router has a statically configured L2 interface towards a BRAS.

An alternative implementation, illustrated in FIG. 17, involves statically configuring the home xDSL router to provide a virtual L2 interface towards the BRAS, where it can tunnel L2 frames. At each mobility event or whenever a local device shows up at a remote access, the MM has to configure the BRAS, not the home xDSL router. As such, the BRAS takes the role of the AR having virtual bridges (or VSIs if it supports VPLS).

The home xDSL router may have direct Ethernet connectivity over PPP to the BRAS. In contrast to traditional DSL solutions (where the PPP session from the customer equipment to the BRAS delivers IP packets), the PPP would have to transmit Ethernet frames. This makes use of the teachings in RFC3518, "Point-to-Point Protocol (PPP) Bridging Control Protocol (BCP)".

The MM in this case has to remotely configure the BRAS (as a home access router) and the remote access router to dynamically establish a L2 tunnel using any L2 tunneling technique that supports the binding of the virtual interface into virtual bridges. This virtual bridge has to switch Ethernet frames decapsulated from the tunnel from the xDSL router (e.g. from the PPP session) and switch the frames to another L2 tunnel leading to the remote location.

Remotely configuring the above described mechanisms in the access routers and access points is possible by remotely accessing the command line interface via, for example, Telnet. Alternatively, for improved performance, a proprietary interface may be used.

Figure 18:
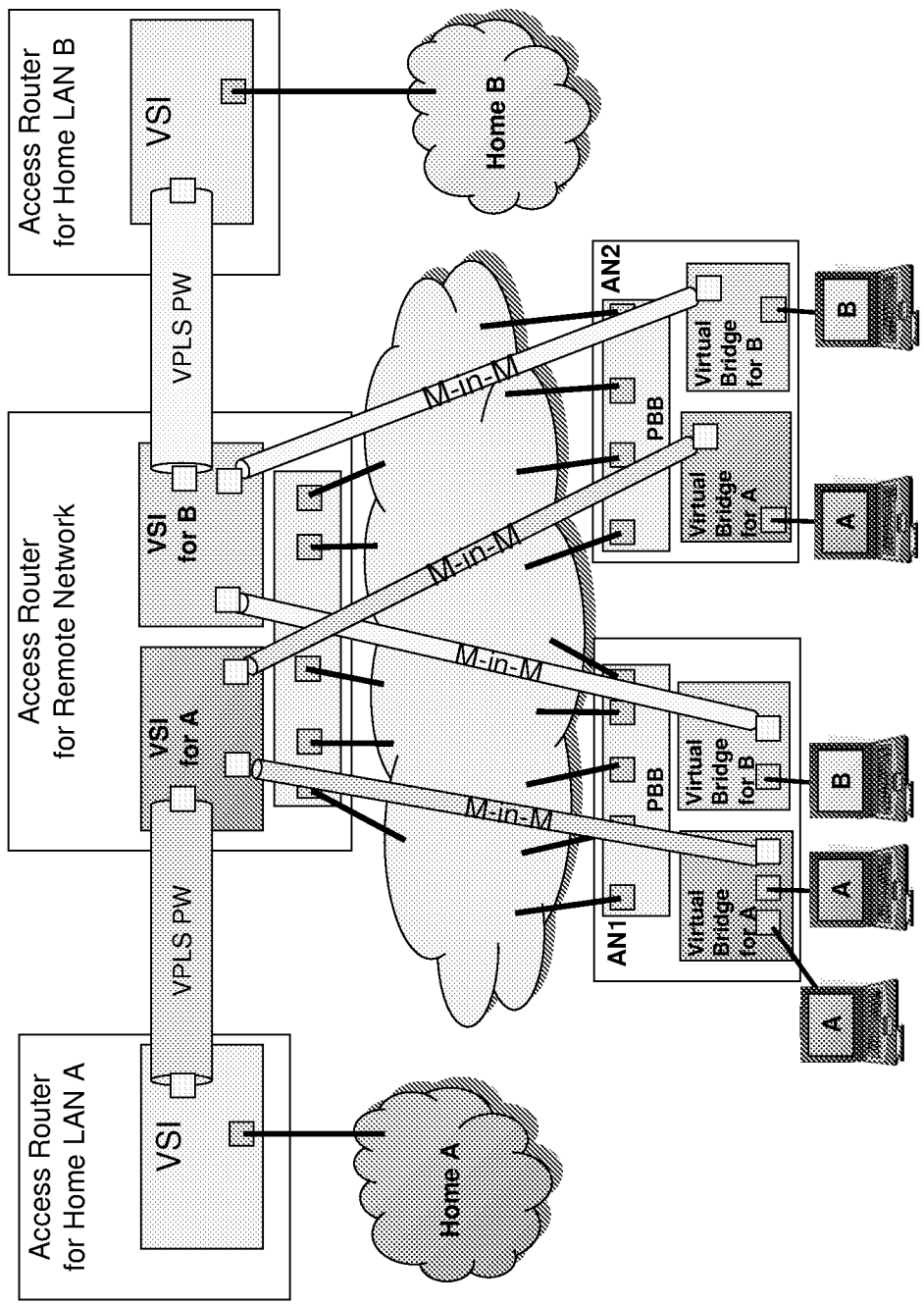
FIG. 18 illustrates schematically the binding of Mac-in-Mac or Q-in-Q capable interfaces along with the VPLS pseudo-wires to VPLS Virtual Switch Instances.

If the backbone provides Virtual Private LAN Service (VPLS) service, the MM has to configure VPLS pseudo-wires between the edge routers. Instead of binding to generic virtual bridges, the MM has to bind Mac-in-Mac or Q-in-Q capable interfaces along with the VPLS pseudo-wires to VPLS Virtual Switch Instances. This is illustrated in FIG. 18.

In some cases, the transparent Ethernet service may be provided through a central node working as the AR of multiple home networks, i.e. a hub and spoke layout. This central node is denoted here as the Connectivity Services Node (CSN). An intervening network may be present between the CSN and the home LAN, in which case it must be ensured that the CSN is connected via a L2 tunnel to the home network. This tunnel can be setup on demand by the MM when a terminal appears at a remote location, or may be pre-configured to speed up the process. Furthermore, the CSN must implement a virtual bridge per home network.

The MM should configure this CSN and connect it via another L2 tunnel when a home terminal shows up at a remote location. If the CSN has no pre-configured tunnel to the home network, the MM has to setup this tunnel.

Figure 19:
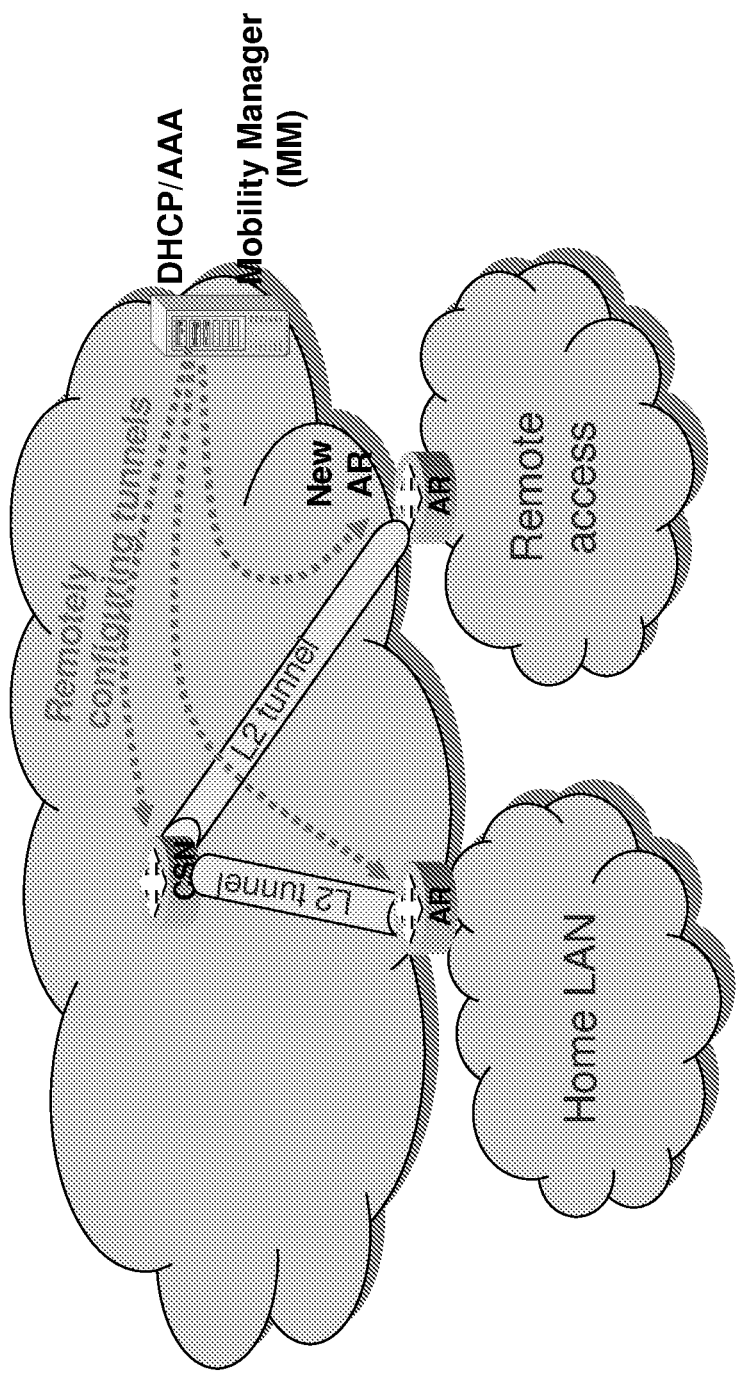
FIG. 19 illustrates a hub and spoke layout in which Ethernet services are provided though a central node.

The hub and spoke layout is illustrated in FIG. 19. Note that logically this scenario is not different from the previously described context if we substitute the home AR with the CSN.

The embodiments presented above allow a network operator to provide a value added connectivity service to its customers, i.e. a nomadic terminal can be transparently connected to its home LAN from any access (e.g. any hot spot) of a fixed network operator. Moreover, if proper contracts are established with partner networks, the connectivity service can be used even from these partners' access networks.

As connectivity to the home network is established on layer 2, the internal IP addressing structure or the IP version used in the home network is not relevant: any combination will work. Furthermore, the moving terminal in the visited network is connected transparently to the home network (here transparency means that the terminal does not recognize that it is not in the home network). This transparent layer 2 connection makes it possible to reach the home network without any dedicated client software in the terminal, as well as supporting those future applications which require Ethernet level connection.

It will be appreciated by the person of skill in the art that various modifications may be made to the above described embodiments without departing from the scope of the present invention.

The invention claimed is:

1. A method of allowing a nomadic terminal to access a home network via a WLAN interface, the method comprising:
connecting said nomadic terminal to a remote access network via a WLAN interface of an access point according to the IEEE 802.1x networking protocol, the remote access network being connected to an operator's backbone network via a remote access router;
exchanging authentication related signaling in respect of said nomadic terminal between the access point and an authentication server within the backbone network in order to authenticate the terminal to the authentication server, wherein said authentication related signaling includes signaling related to the IEEE 802.1x networking protocol;
detecting successful authentication of the nomadic terminal within the backbone network and in response to the detected successful authentication, triggering establishment of an Ethernet tunnel extending across the backbone network for the purpose of connecting said nomadic terminal to the home network;
maintaining within said backbone network a mapping table between home networks and VLAN tags applicable in said remote access network, the method further configuring a virtual bridge in said remote access router to send Ethernet frames decapsulated from said Ethernet tunnel to the home network mapped to the configured VLAN, and configuring said access point to forward and receive Ethernet frames to and from the configured VLAN; and
using a VLAN tag to switch packets at said remote access router between said Ethernet tunnel and the identified virtual LAN, wherein:
the establishment of the Ethernet tunnel results in the nomadic terminal obtaining a home Internet Protocol, IP, address from the home network, and
the nomadic terminal, while connected to the remote access network, uses the home IP address to interact with other networks and devices, wherein said step of establishing the Ethernet tunnel comprises establishing an Ethernet tunnel having an endpoint at said remote access router and extending towards said home network.

2. The method according to claim 1, wherein said step of establishing an Ethernet tunnel comprises establishing an Ethernet tunnel extending from said access point, through said remote access router, towards said home network.

3. The method according to claim 1, wherein said home network is connected to an operator's backbone network via a home access router, and said step of establishing an Ethernet tunnel comprises extending the tunnel to said home access router.

4. The method according to claim 3, wherein said step of establishing an Ethernet tunnel comprises incorporating into the tunnel a pre-established Ethernet tunnel.

5. The method according to claim 1, further comprising informing a Mobility Manager function within the operator's backbone network of a successful authentication, the Mobility Manager function configuring one or both of said remote access router and said remote access point to establish said Ethernet tunnel.

6. The method according to claim 5, wherein the operator's backbone network to which the home network is connected is also the network to which the remote access network is connected, the Mobility Manager function further configuring said home access router to establish said Ethernet tunnel.

7. The method according to claim 5, wherein said home network is connected to an operator's backbone network via a home access router and said step of establishing an Ethernet tunnel comprises extending the tunnel to said home access router, and wherein said step of establishing an Ethernet tunnel comprises incorporating into the tunnel a pre-established Ethernet tunnel, the Mobility Manager function cooperating with a peer Mobility Manager function associated with the home network in order to establish said Ethernet tunnel.

8. A method according to claim 5, said Mobility Manager function being a proxy authentication server receiving authentication signaling from said terminal.

9. An apparatus for providing mobility management within a communication system, the apparatus comprising:
   a memory;
   a processor; and
   a receiver for receiving authentication related signaling in respect of a nomadic terminal connected to an access point of a remote access network via a WLAN interface according to the IEEE 802.1x networking protocol, the apparatus being arranged in use, as a result, to establish an Ethernet tunnel extending across a backbone network for the purpose of connecting said nomadic terminal to the home network, wherein:
   the establishment of the Ethernet tunnel results in the nomadic terminal obtaining a home Internet Protocol, IP, address from the home network, and
   the nomadic terminal, while connected to the remote access network, uses the home IP address to interact with other networks and devices,
   wherein the establishment of the Ethernet tunnel comprises establishing an Ethernet tunnel having an endpoint at said remote access router and extending towards said home network,
   wherein a mapping table is maintained within said backbone network between home networks and VLAN tags applicable in said remote access network, wherein a virtual bridge is configured in said remote access router to send Ethernet frames decapsulated from said Ethernet tunnel to the home network mapped to the configured VLAN, and said access point is configured to forward and receive Ethernet frames to and from the configured VLAN, and
   wherein a VLAN tag is used to switch packets at said remote access router between said Ethernet tunnel and the identified virtual LAN.

10. The apparatus according to claim 9 and being arranged to configure one or both of said remote access router and said remote access point to establish said Ethernet tunnel.

11. The apparatus according to claim 9 and being arranged to configure a home access router coupling said home network to a backbone network to establish said Ethernet tunnel.

12. The apparatus according to claim 9 and being arranged to configure a Broadband Remote Access Server, an L2TP Network Server, or a Connectivity Services Node to establish said Ethernet tunnel.

13. An apparatus for providing a WLAN access point for a nomadic terminal to a remote access network, the apparatus comprising:
   a memory;
   a processor; and
   an interface for connection to a mobility manager within an operator's backbone network, the apparatus being configurable via said interface to establish an Ethernet tunnel between itself and a home network of the nomadic terminal in response to successful authentication of the said terminal based on authentication related signaling in respect of said terminal, wherein:
   the apparatus is configured to connect to said terminal according to the IEEE 802.1x networking protocol,
   the establishment of the Ethernet tunnel results in the nomadic terminal obtaining a home Internet Protocol, IP, address from the home network,
   the nomadic terminal, while connected to the remote access network, uses the home IP address to interact with other networks and devices,
   wherein the establishment of the Ethernet tunnel comprises establishing an Ethernet tunnel having an endpoint at said remote access router and extending towards said home network,
   wherein a mapping table is maintained within said backbone network between home networks and VLAN tags applicable in said remote access network, wherein a virtual bridge is configured in said remote access router to send Ethernet frames decapsulated from said Ethernet tunnel to the home network mapped to the configured VLAN, and said access point is configured to forward and receive Ethernet frames to and from the configured VLAN, and
   wherein a VLAN tag is used to switch packets at said remote access router between said Ethernet tunnel and the identified virtual LAN.

14. The apparatus according to claim 13, the apparatus providing a wireless access point to terminals including said nomadic terminal, the apparatus being configurable to create a virtual bridge bound to said Ethernet tunnel and to an encrypted logical channel on a per terminal basis.

15. An apparatus for providing an access router to interconnect an access network to an operator's backbone network to provide Ethernet switching, comprising:
   a memory;
   a processor; and
   an interface towards a mobility manager within the operator's backbone network, the apparatus being further configurable via said interface to establish an Ethernet tunnel towards a nomadic terminal or towards a home network of a nomadic terminal in response to successful authentication of the said terminal based on authentication related signaling in respect of said terminal, wherein:
   said authentication related signaling includes signaling related to the IEEE 802.1x networking protocol,
   the establishment of the Ethernet tunnel results in the nomadic terminal obtaining a home Internet Protocol, IP, address from the home network,
   the nomadic terminal, while connected to the remote access network, uses the home IP address to interact with other networks and devices, wherein the establishment of the Ethernet tunnel comprises establishing an Ethernet tunnel having an endpoint at said remote access router and extending towards said home network, wherein a mapping table is maintained within said backbone network between home networks and VLAN tags applicable in said remote access network, wherein a virtual bridge is configured in said remote access router to send Ethernet frames decapsulated from said Ethernet tunnel to the home network mapped to the configured VLAN, and said access point is configured to forward and receive Ethernet frames to and from the configured VLAN, and wherein a VLAN tag is used to switch packets at said remote access router between said Ethernet tunnel and the identified virtual LAN.

16. The method of claim 1, wherein the nomadic terminal is not located at the home network.

17. The method of claim 1, wherein the remote access network is directly connected to the home network.

18. The method of claim 1, wherein the nomadic terminal is not a nomadic terminal when the nomadic terminal is located at the home network.

19. The method of claim 7, wherein the Mobility Manager function is a node within the backbone network.

20. The method of claim 19, wherein the cooperation of the Mobility Manager function with the peer Mobility Manager function allows for the nomadic terminal to access the home network even though the nomadic terminal's network operator has an agreement with an own backbone network operator that is different from the backbone network to which the remote access network is attached.

* * * * *